United States Patent
Talyansky et al.

(10) Patent No.: US 8,538,965 B1
(45) Date of Patent: Sep. 17, 2013

(54) DETERMINING A RELEVANCE SCORE OF AN ITEM IN A HIERARCHY OF SUB COLLECTIONS OF ITEMS

(75) Inventors: Roman Talyansky, Haifa (IL); Ran Moshe Bittmann, Tel Aviv (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/477,048

(22) Filed: May 22, 2012

(51) Int. Cl.
G06F 17/30 (2006.01)

(52) U.S. Cl.
USPC .......... 707/736; 707/737; 707/738; 707/748; 707/758

(58) Field of Classification Search
USPC .......................... 707/736, 737, 738, 748, 750
See application file for complete search history.

(56) References Cited

U.S. PATENT DOCUMENTS

| 7,958,126 | B2 * | 6/2011 | Schachter | 707/748 |
| 2008/0147640 | A1 * | 6/2008 | Schachter | 707/5 |
| 2009/0119265 | A1 * | 5/2009 | Chou et al. | 707/3 |
| 2011/0238598 | A1 * | 9/2011 | Borowski et al. | 705/500 |
| 2011/0238675 | A1 * | 9/2011 | Schachter | 707/749 |

* cited by examiner

Primary Examiner — Baoquoc N To

(57) ABSTRACT

A hierarchical collection of items including one or more sub collections of items ordered in a hierarchy is received. A statistical measure of frequency of an item in a sub collection of items is determined. Further, statistical measures of weightages of the item are determined defining a number of sub collections in the hierarchical collection of items in which the item appears and a number of sub collections in which the item appears. A statistical measure of variability defining a number of occurrences of the item in the hierarchical collection of items across different sub collections is calculated. Furthermore, a relevance score of the item is determined based on the statistical measure of frequency, the one or more statistical measures of weightages of the item and the statistical measure of variability. Based on the relevance score, the item is presented on a computer generated graphical user interface.

20 Claims, 6 Drawing Sheets

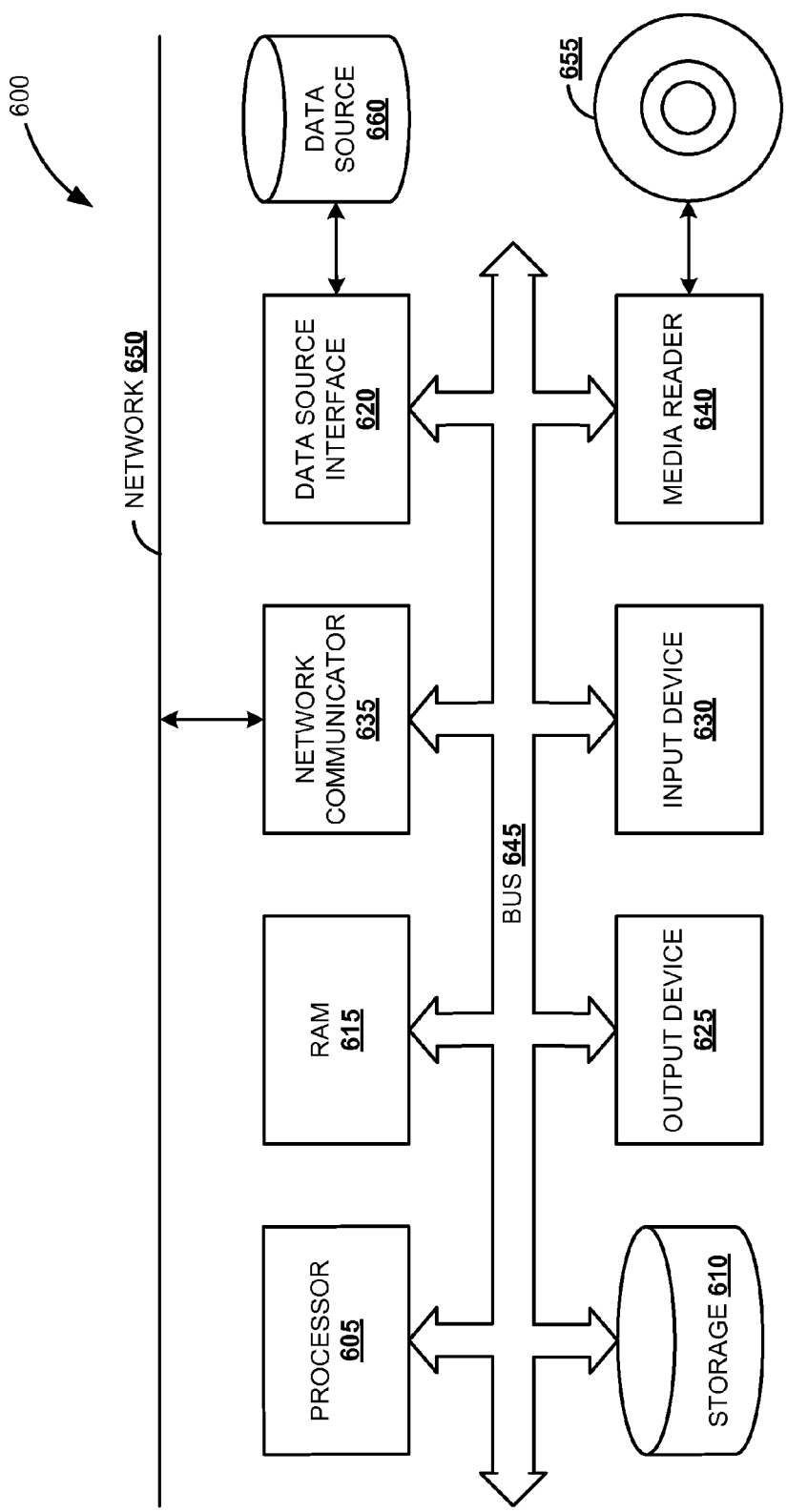

DETERMINING A RELEVANCE SCORE OF AN ITEM IN A HIERARCHY OF SUB COLLECTIONS OF ITEMS

FIELD

Embodiments generally relate to data mining and ranking items based on relevancy and more particularly to methods and systems to determine a relevance score of an item in a hierarchy of sub collections of items.

BACKGROUND

The amount of content or data or items available on the Internet (e.g., time sensitive documents such as blogs, forum posts and the like) continues to increase exponentially. Users with limited information and limited time have difficulty in finding items that satisfy their interests. Thus, several recommendation systems (e.g., text mining systems and information retrieval systems (IR)) are used widely in the art to recommend appropriate items to users based on their inclinations and preferences. A typical way for presenting output of the IR system is by means of listing the documents and sometimes their scores of relevancy. Another popular way to present the output of text mining systems is through tag clouds. Tag clouds are used to present the relevance of items (e.g., text items) in a collection of documents, where relevant text items appear in a dedicated area where relevance is emphasized usually by size and color.

Currently, the text mining systems determine importance or significance of text items using standard Term Frequency-Inverse Document Frequency (tf-idf) techniques and the like. However, one of the challenges in implementing the standard tf-idf technique is that the idf part at a particular small sub collection (e.g., documents pertaining to a week in a yearly corpus of documents) is almost constant as the idf part uses logarithmic function which is very aggressive for small collections. Thus, achieving accurate relevance for the text item through tf-idf technique corresponding to the small sub collection of documents may not be possible. Further, there is no notion of hierarchy in the standard tf-idf technique, other than the simple corpus document hierarchy.

In many cases relevant text items are supervised (e.g., manually selected set of tags). Many tag cloud implementations are based on these supervised tags. However in many practical scenarios, such as in emails, no supervised tags exist. Moreover, even when supervised tags exist, they are not always complete and may not cover all the topics in the document. Therefore, the existing methods of determining relevance score of the text item and generating tag cloud to present relevant text item may not facilitate finding significant, interesting and relevant text item in a document or a collection of documents.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 6 is a block diagram of an exemplary computer system, according to an embodiment.

DETAILED DESCRIPTION

Figure 1:
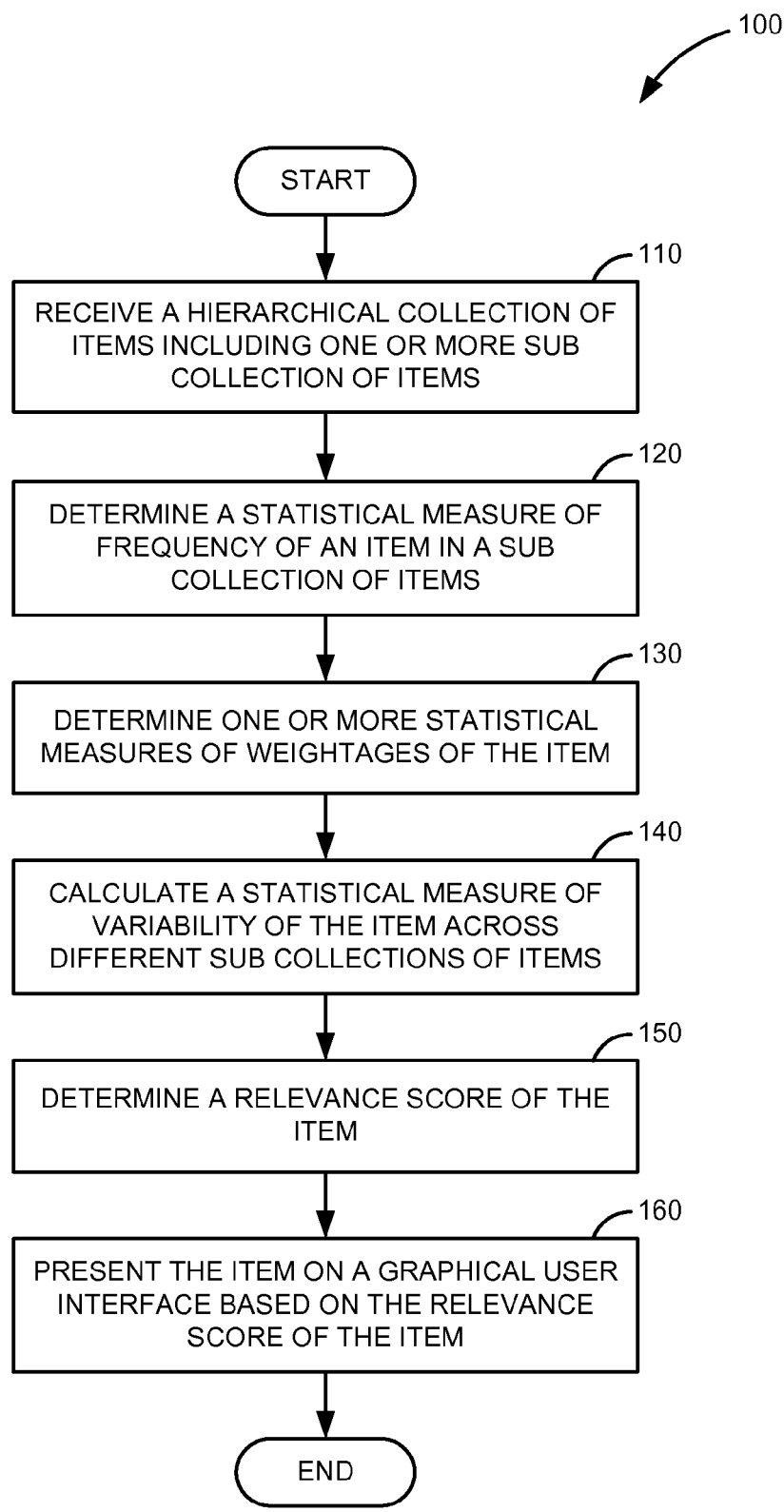
FIG. 1 is a flow diagram illustrating a method to determine a relevance score of an item in a hierarchy of sub collections of items, according to an embodiment.

Embodiments of techniques to determine relevance score of an item in a hierarchy of sub collections of items are described herein. Further, the item is presented graphically on a graphical user interface based on the relevance score of the item using techniques such as tag clouds and the like. According to various embodiments, the tag cloud is a visual representation of items (e.g., text items), where relevant text items appear in a dedicated area, emphasized usually by font, relative to their significance based on various factors. The tag cloud may include a plurality of text items (e.g., topics in a document). The items may be, but are not limited to a word, phrase, paragraph and section, and the items may include, but are not limited to text, special characters, numerals and any combination thereof. Further, tag cloud may be used to present items of a corpus or any sub collection within it. The corpus is a hierarchical collection of documents (e.g., collection of time sensitive documents such as emails, blogs, forum posts and the like) and each document includes a plurality of items. In other words, the hierarchical collection of documents includes one or more sub collection of items ordered in a hierarchy.

According to one embodiment, the relevance score of the item is determined to identify significant items in the hierarchical collection of items corresponding to the sub collection of items (e.g., items corresponding to a time frame). For example, in a corpus (e.g., hierarchical collection of items) corresponding to one year of documents, important or relevant text items in a sub collection of text items corresponding to a time frame (e.g., a week, a month and the like) are presented to a user through the tag cloud. Further, the tag cloud is generated based on a relevance score of the text item. Higher the relevance score, higher the relevancy and vice versa.

In one embodiment, the relevance score is determined based on a statistical measure of frequency of the item, weightages of the item and a statistical measure of variability of the item. Therefore, the important or significant items in the sub collection of items corresponding to the time frame are emphasized whereas the less significant items are suppressed. Thus, higher accuracy in emphasizing significant items in the sub collection of items can be achieved and since the relevance score of the item is determined for the sub collection of items (e.g., time frame such as a week, a month and the like). The method of determining the relevance score of the item in a sub collection of items is described taking an example of email corpus corresponding to a time frame in the below description. However, the method may be implemented in determining a significant item in a set of any collection and sub collection of items (e.g., in a set of books and the like).

In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

FIG. 1 is a flow diagram 100 illustrating a method to determine a relevance score of an item in a hierarchy of sub collections of items, according to an embodiment. At step 110, a hierarchical collection of items of interest is received. In one embodiment, the hierarchical collection is a corpus of documents corresponding to one or more sub collections of times ordered in a hierarchy (e.g., sub collection of items corresponding to a time period of interest). For example, time sensitive documents such as email documents (e.g., 200,000 emails) corresponding to two years' time period (e.g., year 2010 and 2011) are collectively known as hierarchical collection of items. Further, the documents may be made up of one or more items. In one exemplary embodiment, items of significance in the sub collection of items corresponding to a time frame are determined and the same is presented on a graphical user interface using techniques such as a tag cloud. It is to be noted that the method to determine a relevance score of an item is described with an example of a text item in the below description. However, item may be special characters, numerals and any combination thereof. For example, significant text items in the 200,000 emails pertaining to a week (e.g., first week of the month September 2011) are determined.

What items are significant can be configured based on a number of factors. For instance, at step 120, a statistical measure of frequency of an item in a sub collection of items is determined. In one exemplary embodiment, the item is a text item that is analyzed in context of surrounding text items to consider synonyms and inflected forms of the text item (e.g., using a lemmatizer). The lemmatizer is described in greater detail in FIG. 3. The sub collection of documents of the corpus includes one or more documents of the corpus associated with a time frame, for instance. For example, in a corpus including 200,000 emails corresponding to two years' time period, the emails corresponding to a week (e.g., 25 emails corresponding to the first week of September 2011) are concatenated to sub collection of documents. In the sub collection of documents, the normalized number of times the text item, for example the word 'computer' appears, is determined using equation (1).

$$tf_w(item) = (\text{Number of times the item appears in the week})/(\text{Total number of items in the document corresponding to the week}) \quad (1)$$

In $tf_w(item)$, 'tf' stands for the term or item frequency. The $tf_w(item)$ defines the normalized number of times the text item appears in the concatenated document and implies that the more times the item appears in the sub collection of documents, the more significant the item is in the sub collection of documents. For example, assuming the text item, the word 'computer' appears 30 times in the sub collection of documents and the sub collection of documents includes a total of 2000 text items corresponding to the first week of September 2011. The item frequency, $tf_w(\text{computer})$ is 0.015 as in equation (2).

$$tf_w(\text{computer}) = (\text{Number of times the text item, the word 'computer', appears in the first week of September 2011})/(\text{Total number of items in the sub collection of documents corresponding to the first week of September 2011}) = 30/2000 = 0.015 \quad (2)$$

At step 130, one or more statistical measures of weightages of the item defining a number of sub collections in the hierarchical collection of times in which the item appears and a number of sub collections in which the item appears are determined. In one exemplary embodiment, the weightages of the text item defining the number of documents in the corpus in which the item appears is determined using equation (3). For example, the number of documents in the 200,000 emails in which the text item, the word 'computer', appears is determined.

$$idf_d(item) = \log[(\text{Total number of documents in the corpus})/(\text{Number of documents in the corpus where the item appears})] \quad (3)$$

In $idf_d(item)$, 'idf' stands for inverse document frequency. The $idf_d(item)$ defines the number of documents in which the item appears in the corpus and implies that less number of times the item appears, the more significant is the item. For example, assuming the text item, the word 'computer', appears in 45 documents of total of 200,000 documents, the weightages of the text item, the word 'computer', with respect to total number of documents of 200,000 emails, $idf_d(\text{computer})$ is 8.4 as in equation (4).

$$idf_d(\text{computer}) = \log(200{,}000/45) = 8.4 \quad (4)$$

In one embodiment, the weightages of the item defining the number of time frames in which the item appears is determined using equation (5). For example, the number of time frames in the two year time period in which the text item, the word 'computer', appears is determined.

$$idf_w(item) = \log[(\text{Total number of time frames associated with the corpus})/(\text{Number of time frames in which the item appears})] \quad (5)$$

The $idf_w(item)$ defines the number of time frames in which the item appears. For example, assuming the item 'computer' appears in two weeks' time frames of total of 108 weeks (e.g., 108 weeks in two years), the $idf_w(\text{computer})$ is 3.99 as in equation (6).

$$idf_w(\text{computer}) = \log(108/2) = 3.99 \quad (6)$$

Further, $idf_w(item)$ is almost constant for each week as the $idf_w(item)$ uses logarithmic function (as logarithmic function is more aggressive for small numbers). Therefore, a mathematical function which is less aggressive compared to the logarithmic function may be used for achieving the accuracy in determining the significant items. For example, a less aggressive mathematical function such as a square root function may be used. Hence, the weightage of the sub collection of items, in this case the number of time frames (e.g., number of weeks) in which the text item, the word 'computer' appears, is determined using less aggressive mathematical function as shown in equation (7).

$$idf_w^*(item) = \text{sqrt}[(\text{Total number of time frames associated with the corpus})/(\text{Number of time frames in which the item appears})] \quad (7)$$

The $idf_w^*(item)$ defines the number of time frames in which the item appears. For example, assuming the text item, the word 'computer' appears in two weeks' time frames of total of 108 weeks (e.g., 108 weeks in two years), the $idf_w^*$ (computer) is 7.35 as in equation (8).

$$idf_w^*(computer)=sqrt(108/2)=7.35 \quad (8)$$

In one embodiment, the mathematical function is selected by a configuration unit based on the sub collection of items corresponding to the time frame for which the relevance score of the item is determined. The mathematical function may be a logarithmic function, a square root function, a division function (e.g., divide by a constant greater than 1), an exponential function (e.g., $1-e^{-a}$ for $a \geq 0$), a generalization of square root function (e.g., $x^a$ for $a<1$), and the like based on the sub collection of items corresponding to the time frame for which the relevance score of the item is determined. For example, to determine significant items in a time frame of a week, square root function is selected and used in the idf technique. As the configuration unit intelligently selects the mathematical function, domain experts may not be required for performing the method of generation of the tag cloud. The configuration unit is described in greater detail in FIG. 3.

At step 140, a statistical measure of variability defining a number of occurrences of the item in the hierarchical collection of items across different sub collections is calculated. In other words, to further emphasize in determining significant items across sub collections (e.g., weeks), an additional factor, standard deviation ($std_w$(item)) is calculated. For example, the standard deviation ($std_w$(computer)) of the item 'computer' is computed as 3.72 using standard equations used to calculate standard deviation.

At step 150, a relevance score of the item is determined based on the statistical measure of frequency, the one or more statistical weightages of the item and the statistical measure of variability. In one exemplary embodiment, the statistical measure of frequency (e.g., as shown in equation 2), the weightages of the item (e.g., as shown in equations 4, 6 and 8) and the statistical measure of variability are multiplied to determine the relevance score of the text item, the word 'computer' as shown in equation (9).

Relevance score of the text item, the word
'computer'=$tf_w$(computer)×$idf_d$(computer)×$idf_w$(computer)×$idf_w^*$(computer)×$std_w$(computer) (9)

Therefore, relevance score of the text item, the word 'computer' in the first week of September 2011=0.015×8.4×3.99×7.35×3.72=13.75

Similarly, relevance of other items in the sub collection of items is determined.

At step 160, the item is presented on a computer generated graphical user interface, using a technique such as a tag cloud and the like, based on the relevance score of the item in the sub collection of items as determined in step 150. For example, the text item, the word 'computer' is displayed in the tag cloud based on the relevance score 13.75. If other items are having lower relevance score compared to the text item, the word 'computer', the text item, the word 'computer' is emphasized or vice versa. The tag cloud is described with an example in FIG. 5.

Figure 2:
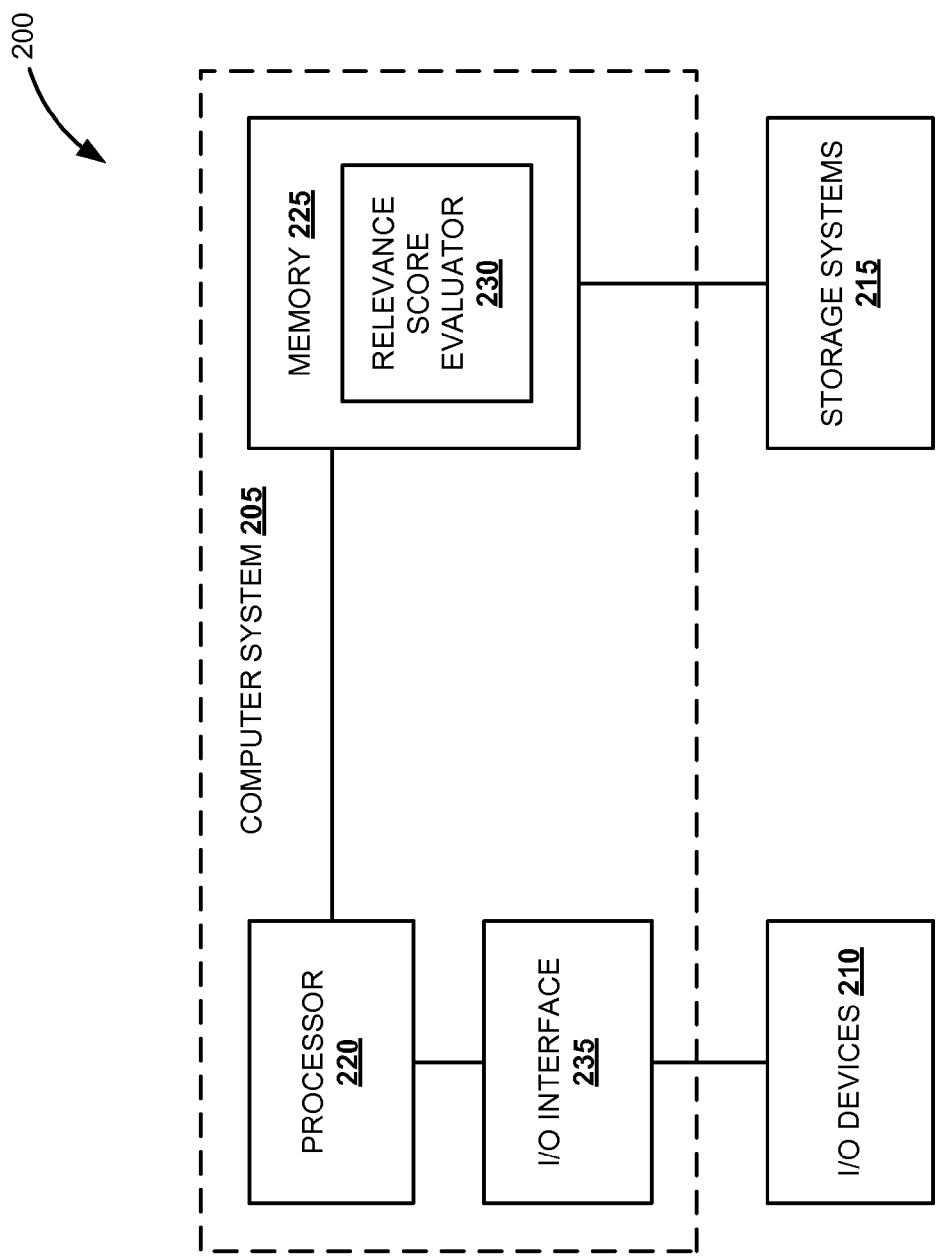
FIG. 2 shows an illustrative computing environment for implementing the method of FIG. 1, according to an embodiment.

FIG. 2 shows an illustrative computing environment 200 for implementing the method of FIG. 1, according to an embodiment. The computing environment 200 includes a computer system 205 communicatively connected to one or more input/output (I/O) devices 210 for a user to interact with the computer system 205 (e.g., for the user to enter input and/or for the computer system 205 to provide at least some of the results of the execution) using I/O interface 235. Further, the computer system 205 may be communicatively connected to one or more external storage systems 215 for storing the output of the computer system 205 for future use. The computer system 205 may be a desktop computer, a work station, a laptop computer, a hand held computer, a smart phone, a console device or the like.

In one embodiment, the computer system 205 includes a processor 220 to execute software instructions or code stored on a memory 225 to perform the method as described in FIG. 1. The computer system 205 is described in greater detail in FIG. 6. In one exemplary embodiment, the memory 225 includes a relevance score evaluator 230. The relevance score evaluator 230 determines a relevance score of an item for a sub collection of items. The relevance score of the item is determined based on a statistical measure of frequency of the item (e.g., as described in step 120 of FIG. 1), one or more weightages of the item (e.g., as described in step 130 of FIG. 1) and the statistical measure of variability (as described in step 140 of FIG. 1). The relevance score evaluator 230 includes a plurality of components to perform the steps described above. The plurality of components in the relevance score evaluator 230 is described in greater detail in FIG. 3.

Figure 3:
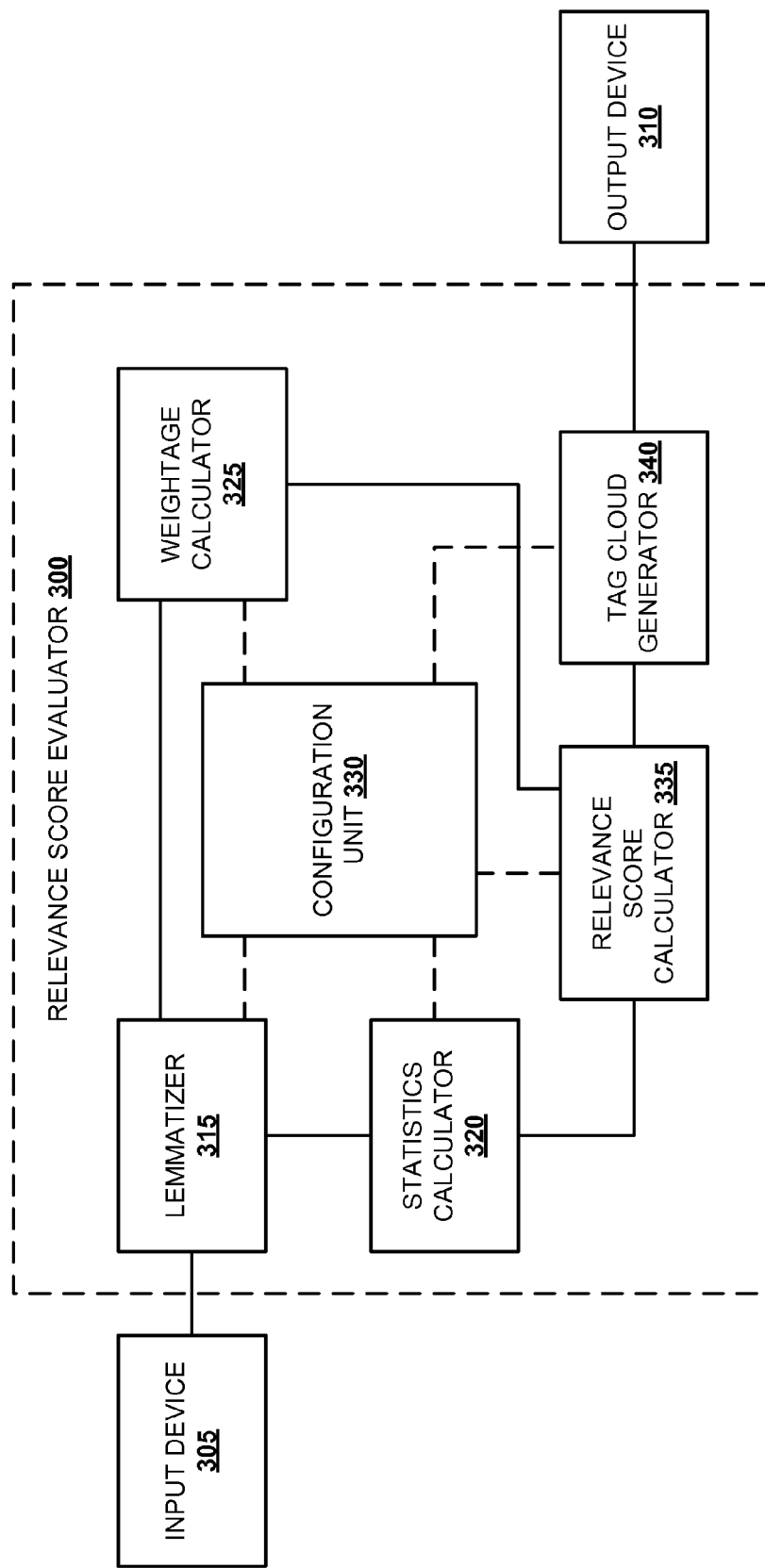
FIG. 3 is a block diagram illustrating a relevance score evaluator, according to an embodiment.

FIG. 3 is a block diagram illustrating a relevance score evaluator 300, according to an embodiment. The relevance score evaluator 300 determines a relevance score of an item and presents the item on a graphical user interface based on the relevance score of the item, emphasizing the significance of each item. For example, the item is presented on a tag cloud based on the relevance score of the item calculated by the relevance score evaluator 300. The relevance score of the item is a statistical measure distinguishing items with higher relevance from less relevant items. In one exemplary embodiment, the relevance score evaluator 300 is communicatively coupled to an input device 305 and an output device 310. The input device 305 provides the hierarchical collection to the relevance score evaluator 300. For example, a set of email documents from an email server is provided to the relevance score evaluator 300. In action, the relevance score evaluator 300 determines the relevance score of the item and based on the relevance score, the relevance score evaluator 300 generates a tag cloud, for the sub collection of items, corresponding to the corpus.

In one embodiment, the relevance score evaluator 300 includes a lemmatizer 315, a statistics calculator 320, a weightage calculator 325, a configuration unit 330, a relevance score calculator 335, and a tag cloud generator 340, which are communicatively coupled as shown in FIG. 3. The lemmatizer 315 groups together the different inflected forms of an item or synonyms, so they can be analyzed as a single item. For example, the item 'better' has 'good' as its lemma and thereby both the items 'better' and 'good' can be considered as single item to determine the relevance score. In another example, the item 'meeting' may be either the base form of a noun or a form of a verb (i.e., 'to meet') depending on the context (e.g., 'in our last meeting' or 'We are meeting again tomorrow'). Further, in the context 'Mr. Said asked for tee', a classic stemmer will interpret the item 'said' as past from of the verb 'say', as the classic stemmer determines the inflected items to their stem, base or root form. However, the lemmatizer 315 understands context and the part of speech of the item in the sentence to determine the synonyms of the item. In one exemplary embodiment, lemmatizer 315 uses Natural Language Processing (NLP) techniques to analyze the items. Thus, the higher accuracy in determining the relevance score of the item may be achieved.

In one embodiment, the statistics calculator 320 calculates a statistical measure of variability defining a number of occurrences of the item in a hierarchical collection of items across one or more sub collections of items. For example, the statistics calculator 320 calculates standard deviation of the number of occurrences of the item (computer') across different time frames (e.g., in weeks' time frame) as described in step 140 of FIG. 1. In other items, statistics calculator 320 is a component responsible for calculation of statistics over the items in the corpus.

In one embodiment, the weightage calculator 325 determines a statistical measure of frequency of the item ($tf_w$(item)) as described in step 120 of FIG. 1. Further, one or more statistical measures of weightages of the item defining a number of sub collections in the hierarchical collection of items in which the item appears $idf_d$(computer) and a number of sub collections (e.g., time frames) in which the item appears ($idf_w$(computer) and $idf_w$*(computer)) are determined as described in step 130 of FIG. 1.

In one embodiment, the configuration unit 330 determines the mathematical function (e.g., a logarithmic function, a square root function, a division function (e.g., divide by a constant greater than 1), an exponential function (e.g., $1-e^{-a}$ for $a \geqq 0$), a generalization of square root function (e.g., $x^a$ for $a<1$) and the like) to be used in determining the weightage of the item based on the sub collection of items (e.g., time frame duration) for which the tag cloud is generated. The mathematical functions other than the logarithmic function and the square root function may be automatically chosen depending on the sub collection of items corresponding to the time frame duration by the configuration unit. Further, the configuration unit 330 may control the other components of the relevance score evaluator 300. For example, the configuration unit 330 controls the lemmatizer 315 and the statistics calculator 320 by selecting an algorithm for lemmatization and statistics calculations depending on the time frame for which the tag cloud is generated.

In one embodiment, the relevance score calculator 335 determines the relevance score of the item based on input from the statistics calculator 320 and the weightage calculator 325. In other items, the relevance score calculator 335 combines the input from the statistics calculator 320 and the weightage calculator 325 to determine the relevance score of the item. In one exemplary embodiment, machine learning methods may be used to optimize the relevance score combination. Further, the configuration unit 330 determines the way in which the two inputs are combined. For example, as in equation (9), the inputs are multiplied to determine the relevance score of the text item, the word 'computer'. However, sophisticated combination other than multiplication may also be used depending on the time frame for which the tag cloud is generated.

In one embodiment, the tag cloud generator 340 receives the relevance score determined by the relevance score calculator 335 and generates the tag cloud accordingly. The tag cloud generator 340 prepares graphic presentation of the items by emphasizing on items with higher relevance scores. Further, the generated tag cloud is presented on a graphical user interface through the output device 310. It is advantageous that technique other than tag cloud may be used to present the item based on the relevance score of the item. In one exemplary embodiment, the configuration unit 330 controls the tag cloud generator 340 regarding the graphical representation of items.

Figure 4:
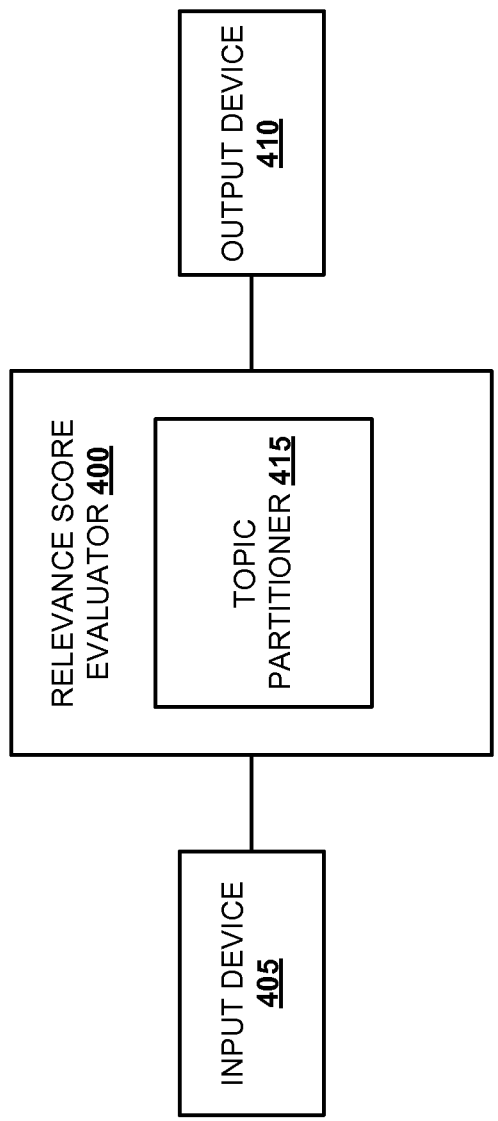
FIG. 4 is a block diagram further illustrating a relevance score evaluator, according to an embodiment.

FIG. 4 is a block diagram further illustrating a relevance score evaluator 400, according to an embodiment. The relevance score evaluator 400 is communicatively coupled to an input device 405 and an output device 410. The input device 405 provides a corpus to the relevance score evaluator 400. In action, the relevance score evaluator 400 generates a tag cloud for the time frame, corresponding to the corpus. Further, the generated tag cloud is displayed on the output device 410.

In one embodiment, the relevance score evaluator 400 includes a topic partitioner 415 along with the other components as described in FIG. 3 such as a lemmatizer, a statistics calculator, a weightage calculator, a configuration unit, a relevance score calculator and a tag cloud generator. The topic partitioner 415 segregates content of the documents corresponding to one or more topic clusters. The topic clusters includes segregation of content of the document based on topics. Further, when a user is interested in a particular topic, the documents of the time frame (e.g., documents corresponding to a week are concatenated to form a sub collection of item) may first be clustered according to topics and the tag cloud may be constructed per individual topic. Furthermore, the user can extract the relevant tag cloud using a search query to extract the search results in an information retrieval (IR) query based search. In one exemplary embodiment, the configuration unit 330 as described in FIG. 3 controls the topic partitioner 415 by switching on or off the topic partitioner 415 based on user's interest.

Figure 5:
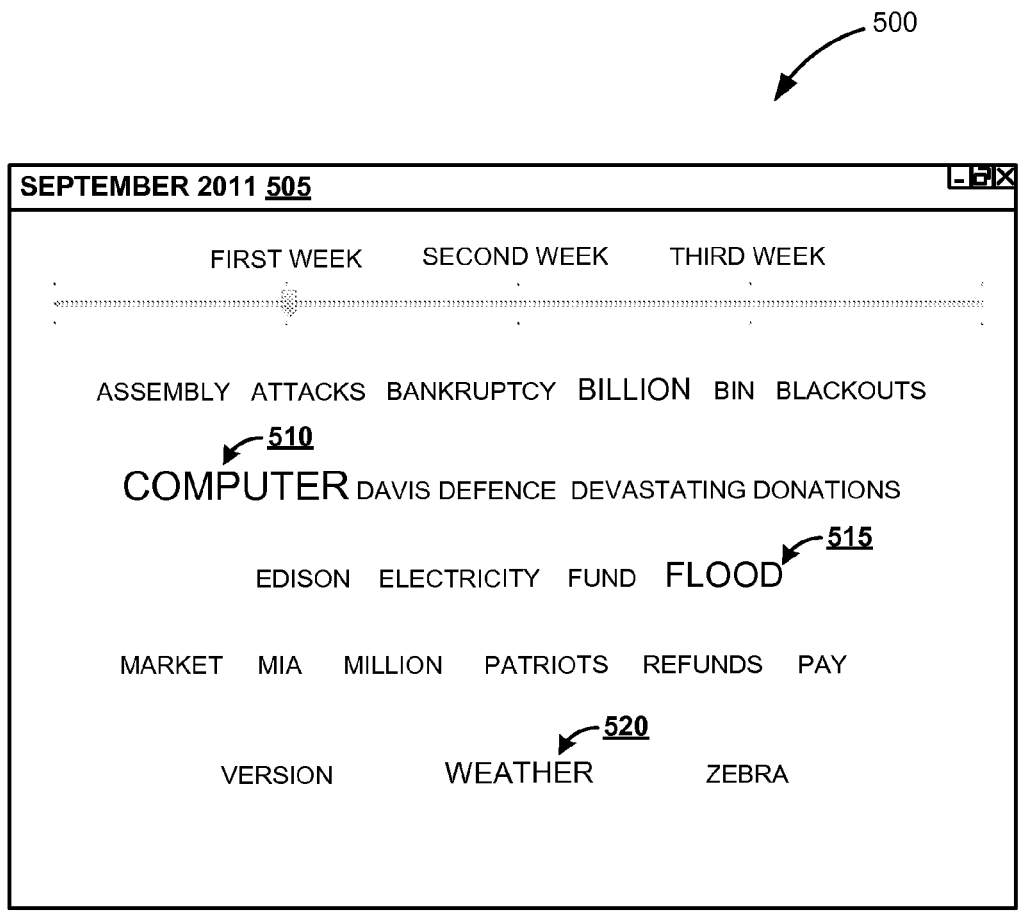
FIG. 5 is an exemplary graphical user interface (GUI) illustrating a tag cloud, according to an embodiment.

FIG. 5 is an exemplary graphical user interface (GUI) 500 illustrating a tag cloud, according to an embodiment. The GUI 500 presents text items in a corpus through a tag cloud. The text items are displayed based on relevance scores of the text items. The relevance scores are determined as described in FIGS. 1 and 3. For example, the relevance score of the text item, the word 'computer' is 13.75 in the first week of September 2011. Similarly the determined exemplary relevance scores of other items are depicted in Table 1.

TABLE 1

| Items | $tf_w$ (item) | $idf_w$ (item) | $idf_w$* (item) | $std_w$ (item) | $idf_d$ (item) | Relevance score |
|---|---|---|---|---|---|---|
| Computer | 0.015 | 3.99 | 7.35 | 3.72 | 8.4 | 13.75 |
| Weather | 0.012 | 0.076 | 1.039 | 4.8 | 10.3 | 0.047 |
| Flood | 0.017 | 2.5 | 6.5 | 3.99 | 9.6 | 10.58 |

The tag cloud for the time frame of first week of September 2011 is depicted in FIG. 5. As per Table 1, the text item, the word 'computer' has a higher relevance score (e.g., 13.75) compared to other two text items 'weather' (e.g., 0.047) and 'flood' (e.g., 10.58). Therefore, the text item 'computer' 510 is displayed with a larger font size compared to the text items 'weather' 520 and 'flood' 515. Further, the text item 'flood' 515 has the next higher relevance score and thereby the text item 'flood' 515 is displayed with larger font size compared to the text item 'weather' 520. The text item 'weather' 520 is displayed with a font size less than the font size of the text item 'flood' 515. In one exemplary embodiment, the items can be emphasized with different colors, highlighting and the like depending on the relevance score of the item.

It is advantageous that the method described above to determine a relevance score of the item and to generate a tag cloud based on the relevance score of the item for a time frame eliminates manual supply of tags and automatically extracts the significant items, using NLP techniques to use as tags for the tag cloud. This avoids human intervention in the process of generation of the tag cloud. Further, the method may be advantageous to an enterprise, which maintains a collection of text messages, e.g. emails, blog posts or recordings of chats that customers have with service representatives. Each day new messages are added to the collection. Using the method described above, the enterprise can identifying key topics for a time frame (e.g., on a weekly basis, on a monthly basis and the like). Thus the new developing topics can be emphasized.

Further, an additional functionality to identify sub-topics in documents and generation of the tag cloud per sub-topic can be achieved to focus on the significant topics using a topic partitioner of the relevance score evaluator.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 6 is a block diagram of an exemplary computer system 600, according to an embodiment. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, are described herein for illustrative purposes, various equivalent modifications are possible within the scope of the one or more embodiments, as those skilled in the relevant art will recognize These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
   receive a hierarchical collection of items including one or more sub collections of items ordered in a hierarchy;
   determine a statistical measure of frequency of an item in a sub collection of items of the one or more sub collections of items;
   determine one or more statistical measures of weightages of the item defining a number of sub collections in the hierarchical collection of items in which the item appears and a number of sub collections in which the item appears;
   calculate a statistical measure of variability defining a number of occurrences of the item in the hierarchical collection of items across different sub collections;
   determine a relevance score of the item based on the statistical measure of frequency, the one or more statistical measures of weightages of the item and the statistical measure of variability; and
   based on the relevance score, present the item on a computer generated graphical user interface.

2. The article of manufacture of claim 1, wherein the hierarchical collection of items comprises a corpus of documents divided into sub collections of documents including one or more items.

3. The article of manufacture of claim 1, wherein the one or more statistical measures of weightages is determined by using a mathematical function based on the sub collection of items, in an inverse document frequency (idf) technique.

4. The article of manufacture of claim 3, wherein the mathematical function is selected by a configuration unit based on the sub collection of items for which the relevance score of the item is determined.

5. The article of manufacture of claim 1, wherein the statistical measure of frequency of the item defines a number of times the item appears in the sub collection of items.

6. The article of manufacture of claim 1, wherein the item comprises a text item analyzed in context of surrounding items to consider synonyms and inflected forms of the item using a lemmatizer.

7. The article of manufacture of claim 1, wherein the sub collection of items comprises a document including one or more topic clusters, wherein the one or more topic clusters includes segregation of items based on topics in the sub collection of items.

8. A computer implemented method to determine a relevance score of an item in a sub collection of items, the method comprising:
   receiving a hierarchical collection of items including one or more sub collections of items ordered in a hierarchy;
   the computer, determining a statistical measure of frequency of the item in the sub collection of items of the one or more sub collections of items;
   the computer, determining one or more statistical measures of weightages of the item defining a number of sub collections in the hierarchical collection of items in which the item appears and a number of sub collections in which the item appears;
   the computer, calculating a statistical measure of variability defining a number of occurrences of the item in the hierarchical collection of items across different sub collections;
   the computer, determining the relevance score of the item based on the statistical measure of frequency, the one or more statistical measures of weightages of the item and the statistical measure of variability; and
   displaying the item on a computer generated graphical user interface based on the relevance score.

9. The computer implemented method of claim 8, wherein the hierarchical collection of items comprises a corpus of documents divided into sub collections of documents including one or more items.

10. The computer implemented method of claim 8, wherein the one or more statistical measures of weightages is determined by using a mathematical function based on the sub collection of items, in an inverse document frequency (idf) technique.

11. The computer implemented method of claim 10, wherein the mathematical function is selected by a configuration unit based on the sub collection of items for which the relevance score of the item is determined.

12. The computer implemented method of claim 8, wherein the statistical measure of frequency of the item defines a number of times the item appears in the sub collection of items.

13. The computer implemented method of claim 8, wherein the item comprises a text item analyzed in context of surrounding items to consider synonyms and inflected forms of the item using a lemmatizer.

14. The computer implemented method of claim 8, wherein the item is displayed on the computer generated graphical user interface through a tag cloud.

15. The computer implemented method of claim 8, wherein the sub collection of items comprises a document including one or more topic clusters, wherein the one or more topic clusters includes segregation of items based on topics in the sub collection of items.

16. A computer system to determine a relevance score of an item in a sub collection of items, the computer system comprising:
   at least one processor; and
   one or more memory devices communicative with the at least one processor, wherein the one or more memory devices store instructions related to:
     a statistics calculator to calculate a statistical measure of variability defining a number of occurrences of the item in the hierarchical collection of items across different sub collections;
     a weightage calculator to determine a statistical measure of frequency of the item in the sub collection of items and one or more statistical measures of weightages of the item defining a number of sub collections in the hierarchical collection of items in which the item appears and a number of sub collections in which the item appears; and
     a relevance score calculator to determine relevance score of the item based on the statistical measure of frequency, the one or more statistical measures of weightages of the item and the statistical measure of variability.

17. The computer system of claim 16, wherein the statistics calculator, the weightage calculator and the relevance score calculator are included in a relevance score evaluator.

18. The computer system of claim 16, further comprising instructions related to a lemmatizer to group together different inflected forms of the item and a tag cloud generator to generate a tag cloud for the sub collection of items to display the item based on the relevance score.

19. The computer system of claim 16, further comprising instructions related to a configuration unit to control the statistics calculator, the weightage calculator, the relevance score calculator and the tag cloud generator.

20. The computer system of claim 16, wherein further comprising instructions related a topic partitioner to segregate content based on topics in the sub collection of items.

* * * * *